United States Patent Office 3,210,929
Patented Oct. 12, 1965

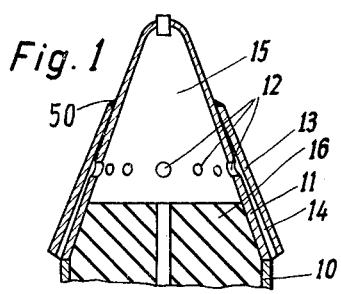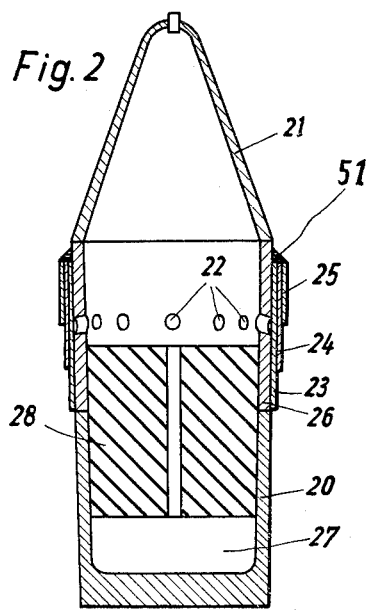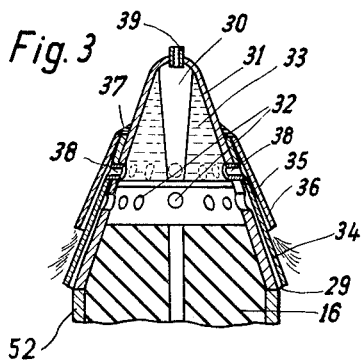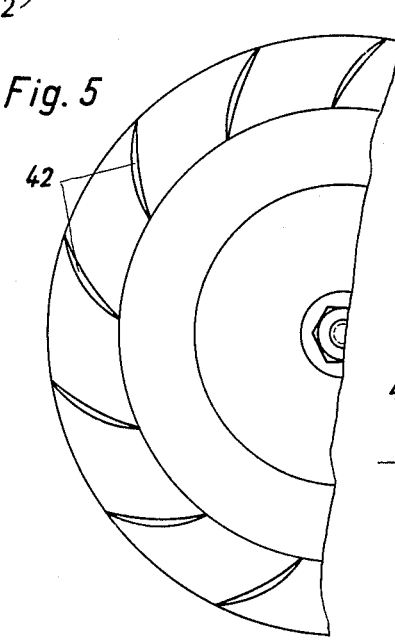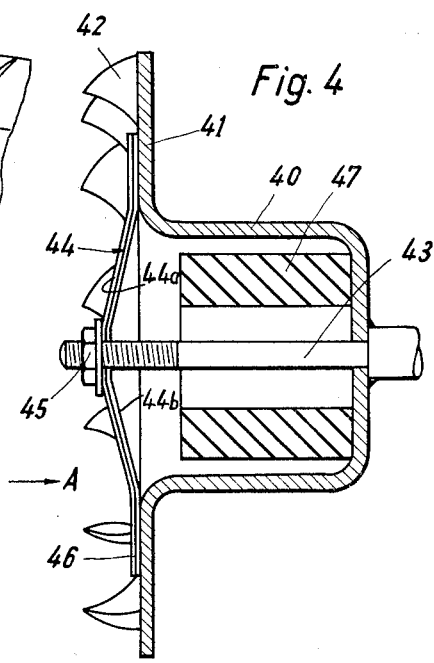

3,210,929
NOZZLE CONSTRUCTION
Franz Rudolf Thomanek, Bindlacher Berg 244,
Bindlach, near Bayreuth, Germany
Filed Jan. 31, 1961, Ser. No. 86,190
Claims priority, application Germany, Feb. 5, 1960,
B 56,534
2 Claims. (Cl. 60—35.6)

This invention relates in general to combustion engine construction and in particular to a new and useful rocket engine construction including overlapping plate members of predetermined thermal expansion characteristics connected together at the discharge of the combustion chamber to define therebetween, upon the occurring of prescribed temperature and pressure conditions, a nozzle for the escape of combustion gases.

Prior to the present invention, combustion chambers have been provided for rockets and similar thrust type engines which include an annular slot or clearance through which the combustion gases are directed under high pressures. In order to change the width of such a slot in thrust nozzles of this type, it was usual to mechanically displace one or both of the annular walls in relation to each other. However, such arrangements require adjusting mechanisms which must be actuated, and it was difficult to provide means to actuate these mechanisms with accuracy. In addition, the mechanical means provided to move the members are subject to rapid deterioration since they are situated in the path or region of the hot combustion gases. It has been extremely difficult to provide mechanisms which vary the width of the annular slots with any degree of accuracy. A particularly distributing influence in this connection is the effect produced by the hot gases in causing heat expansion of the nozzle walls, especially in the cases where the width of the nozzle gap has a range within the heat expansions of the various parts which are employed.

In accordance with the present invention there is provided cooperating plate means which together define a gap through which the combustion gases are directed when the pressure and temperature conditions effecting the various plate members are correctly effected to produce the desired gap opening. These plate members are substantially coextensive laterally of the discharge directions. In one embodiment a rocket engine is provided which includes a conical casing having openings spaced angularly in the annular area around the casing. A conical plate member is connected at its forward periphery to the conical casing and extends downwardly beyond the openings to provide a narrow gap with the casing which extends from the opening to the trailing edge of the conical plate. The materials of the casing of the plates are chosen so that the thermal and pressure influences thereon will produce the desired gap opening for the proper operation of the vessel during its flight. The plate elements which comprise the rocket casing and the outer plate are arranged in a manner and constructed of a material so that the conditions normally effecting the rocket will produce desired changes in the size of the opening of the nozzle gap. The arrangement is such that the heat dissipation or heat conduction produced by the combustion gases as well as by the cooling medium, such as air through which the rocket is propelled effects the desired control on the relative positions of the plates and the casing of the rocket to effectively vary the gap opening in accordance with predetermined optium conditions.

It should be appreciated that to effect the desired expansion or contraction of the parts it is possible to direct both the combustion gases and cooling medium, which may be air or stored liquid or other chemical, over one or both of the plates in order to effect the desired expansion or contraction and at the desired stages of operation.

In cases where the casing and the plates are made of the same material and are of the same dimensions, then if the inner plate member forming the nozzle gap is cooled more than the outer plate member, it will expand a lesser amount than the outer ring and the active nozzle cross sectional area will thus be enlarged. However, if the outer ring is cooled more than the inner ring, then the nozzle cross section, of course, will decrease.

In a preferred embodiment of the invention the heat dissipation or conduction is effected by varying the thermal capacity of the outer and inner rings, thus even in the event that combustion gases only flow through the nozzle very briefly, that is, upon short driving periods, the wall thickness of the outer nozzle ring acts in the manner of a heat container or storage means which significantly influences the magnitude of the nozzle gap opening. For example, if the outer nozzle ring is very thin while the inner nozzle ring is very thick, then the temperature of the outer ring during the heating of the nozzle will increase substantially faster than that of the inner ring so that the nozzle outer ring will be subjected to a larger expansion and the ring gap cross section will thus be enlarged. In the reverse case, if the outer ring of the nozzle has a thick wall while the inner nozzle ring has a thin wall, then the nozzle cross section is diminished during heating of the nozzle because a thin wall nozzle inner ring will expand more and thus will approach the outer ring which is less heated and thus less expanded. Of course, the material of which the nozzle rings are made has also an influence on the heat absorption capacity or thermal capacity and changes in these materials may be made for effecting different movements of the respective rings in accordance with temperature conditions.

In accordance with another aspect of the invention liquids are stored either within the rocket or at a location on the exterior wall and directed over the inner or outer wall forming the respective inner and outer rings of the nozzle upon the occurrence of temperature and pressure conditions and in an amount which may be precalculated to achieve optimal engine performance. For example, it is possible to utilize the cooling effect of the moving air over the surface of the missile to cause a rapid cooling of the exterior ring without a similar cooling to the interior ring. Materials may also be stored within containers which may melt on the skin of the missile to douse one or more of the rings to effect cooling thereon when predetermined conditions of temperature and pressure are approached. Of course, the constructional configuration of the nozzle surface to vary the effective heat transfer area will produce calculated changes in the affected parts.

In accordance with another feature of the invention, it is possible to achieve a series of thermally independent changes in the nozzle gap dimension by employing a plurality of overlapped plate members which may advantageously be of different lengths and of different materials. The use of a plurality of such plates produces different thermal expansion conditions in each plate which may be used to produce a change in contour of the plate which defines with the casing of the rocket the gap for the escape of the combustion gases. In this way the gap opening may approach a pure nozzle design wall construction. Initial deformations may be made to one or more of the plates, such as by annealing or pretensioning of the layers for obtaining desired results. Means may be employed for deflecting the jets of combustion gases as they are directed through the nozzles or after they exit from the nozzles for the purpose of steering or controlling the path of the flying body or rocket.

While in the embodiment previously mentioned the control is obtained principally by the differences in effect on the various materials employed by temperatures, it should be appreciated that the pressures produced by the combustion of the gases may be used to produce the same or similar results.

Accordingly, it is an object of this invention to provide an improved combustion chamber construction.

A further object of this invention is to provide an improved thrust engine construction including overlapping plate elements which together define a nozzle gap for the exit of combustion gases wherein the plate elements are connected together in such a manner and are constructed of a material which will effect desired changes in the gap openings on the occurrence of predetermined temperature conditions during the operation of the engine.

A further object of the invention is to provide a rocket engine having a casing with an opening therein and including a plate member surrounding said casing and connected at its one end to said casing and extending from said connection to a location closing the opening, said outer member being movable upon change in atmospheric conditions to vary an annular gap opening defined between the rocket casing and the member.

A further object of the invention is to provide a rocket engine construction including a conical nose portion having at least one opening therein and a ring member connected to the conical casing and extending rearwardly from such connection to overlie said opening, and defining with said casing an annular gap for the exit of combustion gases through said opening and through said gap, said ring being of a material and dimension to expand and contract by a different amount from said casing whereby to vary the annular gap in accordance with temperature and pressure conditions.

A further object of the invention is to provide a rocket engine construction including a conical casing having an opening therein, a plurality of annular ring members connected to said casing at the forward ends and disposed to overlie said openings, said annular members defining annular gap openings with each other and with the conical casing, and means for conducting liquid for cooling purposes through one of the openings whereby to cool one of the plates and vary the expansion between the plates and the casing.

A further object of the invention is to provide a combustion chamber construction including an outer casing wall defining the combustion chamber having openings for the escape of combustion gases therethrough, and a plurality of plates connected to the forward portion of the casing walls and disposed to cover the openings, the plates being independently affected by temperature and pressure whereby the casing and the adjacent plates define a gap opening for the escape of gases therebetween in accordance with the expansion and contraction of all of said plates.

A further object of the invention is to provide a rocket engine construction including a combustion chamber jacket having a flange portion and a bimetallic plate member disposed to cover the flange portion and being expansible by a different amount than the jacket to define with the jacket an annular opening for combustion gases, and including vane means at the periphery of the bimetallic element to cause directional movement of the rocket by the passage of the escaping gases thereover.

A further object of the invention is to provide a rocket engine construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be made to the accompanying drawings and descriptive matter in which there are illustrated and described preferred embodiments of the invention.

In the drawings:

FIG. 1 is a fragmentary partial longitudinal section of a thrust engine constructed in accordance with the invention;

FIG. 2 is a longitudinal section of another embodiment of a thrust engine;

FIG. 3 is a fragmentary longitudinal section of still another embodiment of a thrust engine;

FIG. 4 is a fragmentary longitudinal section of the combustion engine portion of a rocket constructed in accordance with the invention; and FIG. 5 is a bottom elevation of the embodiment indicated in FIG. 4.

Referring to the drawings in particular, the invention embodied therein includes a rocket or flying body having a rear part 10 and a forward conical casing part or inner ring 11. The conical casing part 11 is provided with an annular area having a plurality of circumferentially spaced openings 12 for the passage of combustion gases which are burned in a combustion chamber portion 15. A drive charge 16 is retained within the portion of the conical casing 11 and the rear part 10.

In accordance with the invention, a frusto-conical ring or sleeve 13 is connected to the conical casing 11, such as by welding, at 50. The annular ring 13 constitutes an outer ring which forms together with the conical casing 11 an annular gap 14 which is opened at the rear and defines a nozzle for the escape of combustion gases which exit from the openings 12.

Prior to the ignition of the engine, the frusto-conical ring or sleeve 13 bears along the complete length of its interior surface on the conical casing 11. Due to the pressure which occurs upon ignition of the charge 16, an expansion of the conical ring 13 takes place so that the annular gap 14 is formed between the ring 13 and the casing 11 and acts as a nozzle for the propulsion of the rocket. The gap 14 becomes larger upon increased heating of the outer ring 13 because the heat which is absorbed by the casing front portion 11 is conducted away to the entire casing and to the rear part 10.

The outer ring 13 which is cooled by the air passing as the flying body is propelled very soon reaches a maximum temperature. After the maximum temperature is reached, the nozzle gap 14 is again diminished because the heating of the nozzle inner ring 11 causes expansion of the ring 11 and a lessening of the gap.

The closing of the gap 14 proceeds more rapidly because the casing part 11 is additionally heated by the burning of the combustion gases within the combustion chamber 15. A reduction of the size of the nozzle gap 14 proceeds for short periods until a boundary or limit value is reached which corresponds to the temperature within the nozzle and between the walls of the casing 11 and the ring 13. By choosing the thickness of the conical casing 11 and the outer ring 13 of the nozzle 14, a predetermined change of the nozzle cross sectional area may be obtained at any given inner pressure within the combustion chamber.

In FIG. 2 there is indicated another embodiment in which there is provided a dish-shaped rear portion 20 of a rocket casing which also includes an annular plate or nozzle portion 26 having nozzle openings 22 and a conical front portion 21. The interior 27 of the dish-shaped portion 20 and the nozzle portion 26 is provided with a series of openings or bores 22. A plurality of annular plate members or ring members, in this case sleeves 23, 24 and 25, are connected at their forward ends as by welding 51 to the upper forward end of the nozzle portion 26. The ring members are either pretensioned or arranged to bear strongly against the nozzle portion 26 as indicated in FIG. 2 and are expanded upon ignition of the charge so that a small nozzle gap is formed extending from the opening 22 to the trailing edge of the longest ring member or sleeve 23. Due to the fact that the individual ring members are of varying lengths the expansion of the ring member 23 in respect to the wall 26 of the nozzle portion is such that a gap is formed which approaches the ideal nozzle configuration. Since combustion takes place within the interior of the nozzle portion 26 it is heated at a much more rapid pace than the successive outer sleeves or ring members 23, 24, 25 so that the nozzle cross section changes during the operation of the engine. By preselecting the precise shapes of the ring members 23, 24 and 25, as well as by choosing the materials in respect to their expansion characteristics and contraction characteristics, the change of the nozzle width can be accurately determined for the complete stage of flight of the missile. Due to the fact that the nozzle may be arranged in the cylindrical part of the flying body, the maximum possible axial thrust of the nozzle may be obtained.

In FIG. 3 there is indicated another embodiment of flying body which is arranged to turn rapidly about its longitudinal axis during operation. The body includes a rear portion 52 and a forward conical casing or engine jacket 31 over which are positioned conical rings or annular plate members 34 and 35 of different lengths which are secured to the conical casing 31 by welding 37. Between the rings or sleeves 34 and 35 there is a small gap 36 which is supplied with liquid fed through a plurality of radially extending pipes 38 arranged in a series around the lower end of a conical liquid reservoir forward portion 33 which is supplied with liquid from a container 30.

The outlet pipes 38 are closed by the outer ring or sleeve 35 as long as the engine has not been ignited. After ignition of the engine, the rings 35 and 34 expand under the action of the hot combustion gases which emerge through the opening 32 between the plate 34 and casing 31 in a gap 29. The gases cause expansion of the sleeve 35 by an amount to open the outlet pipes 38 so that liquid 33 is directed therethrough by the action of a damming pipe 39 at the forward end of the missile. The damming pipe is maintained under damming pressure by the air pressure caused by the flight of the missile through the air.

Liquid is subjected to centrifugal force during the rotation of the flying body and flows out through the gap 36 and cools the sleeve 34 which forms the outer wall of the nozzle or gap 29. This cooling effect causes a reduction in the area of the nozzle 29 which reduction can be set to start at a predetermined time after flight in accordance with known pressure and temperature conditions.

In FIGS. 4 and 5, there is indicated still another embodiment of the invention in which a combustion chamber jacket 40 of channel-shaped construction having a side flange 41 is provided. The side flange 41 forms a nozzle disc which contains a plurality of radially extending directional vanes on its exterior face. The vanes 42 are located at the circumference of the nozzle disc 41 for the purpose of causing a rotation or twist of the rocket. A rod 43 extends centrally through the combustion chamber 40. A cover disc member 44 composed of two metallic elements is secured to the nozzle disc 41 by means of a washer and bolt member 45. The bolt is threaded onto the rod 43 by an amount to cause a predetermined tension against the cover disc 44. Since the cover disc 44 is composed of an outer layer 44a and an inner layer 44b, the expansion of the inner layer is much more rapid than the outer layer due to the exposure thereto of the temperatures of the combustion gases caused by the charge 47.

The combustion gases develop a pressure after the engine has been started which acts on the entire inner surface of the cover disc 44 and deforms it to an extent that an annular gap is formed between the outer rim 46 of the disc 44 and the nozzle 41 through which the combustion gases flow outwardly in a radial direction. The flowing gases strike the vanes 42 and are deflected by these vanes. The reaction of the deflection forces acts as a torsional moment or propeller torque on the combustion chamber 40 and the flying body, and imparts to the flying body a twisting or rotational movement.

As the engine cover disc heats up, an additional deformation occurs so that the nozzle is opened still further. By choosing appropriate materials for the individual layers of the cover disc, it acts as a bimetal which deflects inwardly and outwardly in accordance with the change of temperatures which occur during the operation of the engine. The differential heating of the rod 43 which presses the cover disc 44 as compared with the engine casing 40 as well as the tensioning of the bolt 45 are all factors which effect the amount of nozzle opening during the operation of the engine.

While specific embodiments of the invention have been shown and described in detail to illustrate the application of the invention principles, it will be understood that the invention may be embodied otherwise without departing from such principles.

What is claimed is:

1. A flying body including a tubular casing defining a combustion chamber having a combustion gas discharge opening defined therethrough, a ring member closely fitted around the exterior of said casing and covering the opening in said casing, means securing the forward end of said ring member to said casing in touching contact therewith, the opposite end of said ring member defining with said casing an annular opening, said plate and said casing being independently dimensionally variable under the influence of temperature and pressure of combustion in said combustion chamber and the discharge of the gaseous products of combustion through said gas discharge opening, said tubular casing including a conical forward end, means in the conical forward end of said tubular casing for storing liquid therein, and a liquid discharge opening defined in the casing and located to direct liquid over said ring member.

2. A flying body according to claim 1, including a second ring member secured to the tubular casing forward of the liquid discharge opening and having a free edge overlying said discharge opening and a portion of said first ring member.

References Cited by the Examiner

UNITED STATES PATENTS

| 2,468,820 | 5/49 | Goddard. | |
| 2,563,270 | 8/51 | Price | 60—35.6 |
| 2,648,191 | 8/53 | Featonby | 60—35.6 |
| 2,743,576 | 5/56 | Crockett | 60—39.47 |
| 2,870,599 | 1/59 | Long | 60—35.6 |
| 3,026,806 | 3/62 | Runton et al. | |

FOREIGN PATENTS

| 729,133 | 12/42 | Germany. |
| 126,325 | 5/19 | Great Britain. |
| 792,910 | 4/58 | Great Britain. |

OTHER REFERENCES

Klockner, German application 1,055,882, April 1959.

SAMUEL LEVINE, *Primary Examiner.*

ABRAM BLUM, *Examiner.*